(12) United States Patent
Wardman et al.

(10) Patent No.: US 9,781,140 B2
(45) Date of Patent: Oct. 3, 2017

(54) HIGH-YIELDING DETECTION OF REMOTE ABUSIVE CONTENT

(71) Applicant: PAYPAL, INC., San Jose, CA (US)

(72) Inventors: Bradley Wardman, Phoenix, AZ (US); Blake Butler, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 44 days.

(21) Appl. No.: 14/827,494

(22) Filed: Aug. 17, 2015

(65) Prior Publication Data

US 2017/0054739 A1 Feb. 23, 2017

(51) Int. Cl.
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC . H04L 63/1416; G06F 3/0482; G06F 17/2235
See application file for complete search history.

(56) References Cited

U.S. PATENT DOCUMENTS

| | | | | |
|---|---|---|---|---|
| 6,167,568 A * | 12/2000 | Gandel | ............ | G06F 8/61 705/26.1 |
| 7,013,323 B1 * | 3/2006 | Thomas | ............ | G06Q 30/02 707/999.004 |
| 7,801,868 B1 * | 9/2010 | Kaminski, Jr. | ... | G06F 17/30244 707/687 |
| 8,041,632 B1 * | 10/2011 | Coleman | ............ | G06Q 30/0202 705/38 |
| 8,424,091 B1 * | 4/2013 | Su | ............ | H04L 51/12 713/187 |
| 8,516,590 B1 * | 8/2013 | Ranadive | ............ | H04L 63/1433 713/187 |
| 8,543,675 B1 * | 9/2013 | Yiu | ............ | G06F 3/0484 709/223 |
| 8,666,811 B1 * | 3/2014 | Chen | ............ | G06Q 30/02 705/14.26 |
| 8,763,120 B1 * | 6/2014 | Forristal | ............ | G06F 21/566 726/23 |
| 8,826,426 B1 * | 9/2014 | Dubey | ............ | H04L 63/14 726/22 |
| 9,178,901 B2 * | 11/2015 | Xue | ............ | H04L 63/1425 |
| 9,356,941 B1 * | 5/2016 | Kislyuk | ............ | H04L 63/14 |
| 2005/0228860 A1 * | 10/2005 | Hamynen | ............ | G06F 17/30241 709/203 |
| 2008/0250159 A1 * | 10/2008 | Wang | ............ | G06F 21/6218 709/239 |
| 2009/0125444 A1 * | 5/2009 | Cochran | ............ | G06Q 30/0185 705/50 |
| 2009/0300768 A1 * | 12/2009 | Krishnamurthy | ..... | G06F 21/552 726/26 |
| 2010/0281535 A1 * | 11/2010 | Perry, Jr. | ............ | G06Q 10/107 726/22 |
| 2011/0107413 A1 * | 5/2011 | Chawla | ............ | H04L 63/0227 726/12 |

(Continued)

*Primary Examiner* — Hadi Armouche
*Assistant Examiner* — Cheng-Feng Huang
(74) *Attorney, Agent, or Firm* — Haynes and Boone, LLP

(57) ABSTRACT

Methods, systems, and computer program products for providing high-yielding detection of remote abusive content are disclosed. A computer-implemented method may include generating a graphical user interface allowing users to submit a web link for analysis to determine whether the web link is associated with malicious content, receiving the web link from the user via the graphical user interface, sending the web link to a plurality of distributed server machines to allow each of the distributed server machines to test the web link, generating a plurality of test user profiles to test the web link, testing the web link by each of the distributed server machines using one or more of the test user profiles, receiving a test result for the web link from each of the distributed server machines, and displaying a report comprising the test results for the web link to the user via the graphical user interface.

20 Claims, 5 Drawing Sheets

(56) References Cited

U.S. PATENT DOCUMENTS

| | | | |
|---|---|---|---|
| 2012/0166276 A1* | 6/2012 | Chitnis | G06Q 30/0251 705/14.49 |
| 2012/0317622 A1* | 12/2012 | Harjanto | G06F 21/44 726/4 |
| 2013/0072233 A1* | 3/2013 | Sandholm | H04W 4/185 455/456.3 |
| 2013/0073358 A1* | 3/2013 | Sandholm | G06Q 30/0631 705/14.11 |
| 2013/0073581 A1* | 3/2013 | Sandholm | G06F 17/30545 707/769 |
| 2013/0159233 A1* | 6/2013 | Mason | G06F 17/30864 706/45 |
| 2013/0159826 A1* | 6/2013 | Mason | G06F 17/30873 715/205 |
| 2013/0205370 A1* | 8/2013 | Kalgi | H04W 12/10 726/3 |
| 2013/0276129 A1* | 10/2013 | Nelson | H04N 21/23418 726/26 |
| 2014/0096246 A1* | 4/2014 | Morrissey | G06F 21/51 726/23 |
| 2014/0199664 A1* | 7/2014 | Sadeh-Koniecpol | G09B 5/00 434/118 |
| 2014/0279624 A1* | 9/2014 | Liu | G06Q 50/01 705/319 |
| 2014/0283078 A1* | 9/2014 | Redfoot | H04L 63/1441 726/24 |
| 2015/0007312 A1* | 1/2015 | Pidathala | H04L 63/145 726/22 |

\* cited by examiner

| [Servers] | [Resolved IP] | [Subnet Range] | [Provider] | [Content-Length] | [Hash] | [Access] |
|---|---|---|---|---|---|---|
| Los Angeles CA, United States | 169.158.198.99 | 168.158.0.0/16 | Sprint | Forbidden | 5affc4da1e9bfe110ec2ee25cf8b7071 | · |
| Reston VA, United States | 169.158.198.99 | 168.158.0.0/16 | Sprint | Forbidden | 5affc4da1e9bfe110ec2ee25cf8b7071 | · |
| Etobicoke ON, Canada | 169.158.198.99 | 168.158.0.0/16 | Sprint | Forbidden | 5affc4da1e9bfe110ec2ee25cf8b7071 | · |
| Sao Paulo, Brazil | 169.158.198.99 | 168.158.0.0/16 | Sprint | 196 | cfb940d2ed9191be3d818677cbf29835 | + |
| London, United Kingdom | 169.158.198.99 | 168.158.0.0/16 | Sprint | 196 | cfb940d2ed9191be3d818677cbf29835 | + |
| Paris, France | 169.158.198.99 | 168.158.0.0/16 | Sprint | 196 | cfb940d2ed9191be3d818677cbf29835 | + |
| Berlin, Sachsen, Germany | 169.158.198.99 | 168.158.0.0/16 | Sprint | Forbidden | 5affc4da1e9bfe110ec2ee25cf8b7071 | · |
| Milan, Italy | 169.158.198.99 | 168.158.0.0/16 | Sprint | 196 | cfb940d2ed9191be3d818677cbf29835 | + |
| Ankara, Turkey | 208.204.80.112 | 208.204.80.0/24 | MCI | 254 | 6aa980dae77c4ab0279b1ed98ed7863d | x |
| St. Petersburg, Russia | 169.158.198.99 | 168.158.0.0/16 | Sprint | 196 | cfb940d2ed9191be3d818677cbf29835 | + |
| Karachi, Pakistan | 169.158.198.99 | 168.158.0.0/16 | Sprint | Forbidden | 5affc4da1e9bfe110ec2ee25cf8b7071 | · |
| Mumbai, India | 169.158.198.99 | 168.158.0.0/16 | Sprint | 196 | cfb940d2ed9191be3d818677cbf29835 | + |
| Bangkok, Thailand | 169.158.198.99 | 168.158.0.0/16 | Sprint | 196 | cfb940d2ed9191be3d818677cbf29835 | + |
| Kota Kinabalu, Malaysia | N/A | N/A | N/A | N/A | N/A | x |
| Beijing, China | N/A | N/A | N/A | N/A | N/A | x |
| Sydney NSW, Australia | 169.158.198.99 | 168.158.0.0/16 | Sprint | Forbidden | 5affc4da1e9bfe110ec2ee25cf8b7071 | · |

FIG. 4

HIGH-YIELDING DETECTION OF REMOTE ABUSIVE CONTENT

TECHNICAL FIELD

The present disclosure generally relates to computer systems and, more particularly, to the security of computer systems and Internet services.

BACKGROUND

Cybercrime generally refers to criminal activity involving computer systems. Such criminal activity includes the use of computer systems to perpetrate crimes and illegally access private electronic data. Cybercriminals may gain access to private user account information in a number of ways. For example, cybercriminals may obtain user account credentials and information by exploiting weaknesses in centralized computer systems, by infiltrating local computer systems of users, by tricking users into providing account information, by stealing user account information directly from a company, and by intercepting user account information on a network.

Phishing is a type of cybercrime that criminals use to acquire sensitive information such as usernames, passwords, financial account details, social security numbers, and other private data from users. In phishing, cybercriminals masquerade as a trustworthy entity in an electronic communication, such as an e-mail, instant message, mistyped website, etc. For example, a cybercriminal may send a communication purporting to be from an e-mail provider, social networking website, auction website, bank, or an online payment processor to lure unsuspecting users into providing private and sensitive data. Thus, cybercriminals use phishing and other fraudulent schemes to gain trust from users who are unable to determine that an electronic message or website is malicious.

Phishing and other fraudulent online schemes continue to increase both in number and in sophistication. Therefore, providing new and improved ways of identifying, mitigating, and blocking malicious content to protect users and organizations are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

FIG. 4 is a diagram illustrating an example software application providing high-yielding detection of remove abusive content, in accordance with various examples of the present disclosure.

DETAILED DESCRIPTION

Systems, methods, and computer program products for providing high-yielding detection of remote abusive content are disclosed. The amount of abusive content on the Internet and the sophistication by which cybercriminals deliver such content continue to increase. For example, cybercriminals have employed a new type of phishing scheme that delivers abusive content to targeted audiences while concealing the same content from service providers, security authorities, law enforcement, and other parties. Cybercriminals conceal abusive content to make it more difficult to detect, identify, and shut down fraudulent schemes. For example, a security authority prevented from accessing abusive cannot confirm the existence or nature of the content. Further, the security authority generally is unable to block access to or remove the abusive content without proper evidence or justification.

In examples of the present disclosure, a malicious content detection system uses a plurality of distributed server machines to perform testing of a web link from different geographic locations using multiple client configurations. Such testing provides a more comprehensive picture of content returned by a web link under a variety of conditions, thereby allowing a security provider to access and gain visibility into fraudulent schemes concealed by cybercriminals.

In an example, a malicious content detection system provides a graphical user interface that allows a user to submit a web link for analysis to determine whether the web link is associated with malicious content. The malicious content detection system receives the web link submitted via the graphical user interface and provides the web link to a plurality of geographically distributed server machines having different configurations to test the web link. The malicious content detection system then receives and analyzes web link test results from each of the distributed server machines and displays test results and analysis to the user via the graphical user interface.

Accordingly, aspects of the present disclosure provide insight into the behavior of online content accessed from different geographic locations under various conditions to allow discovery, identification, and removal of abusive content that would otherwise remain undetected and unknown.

Figure 1:
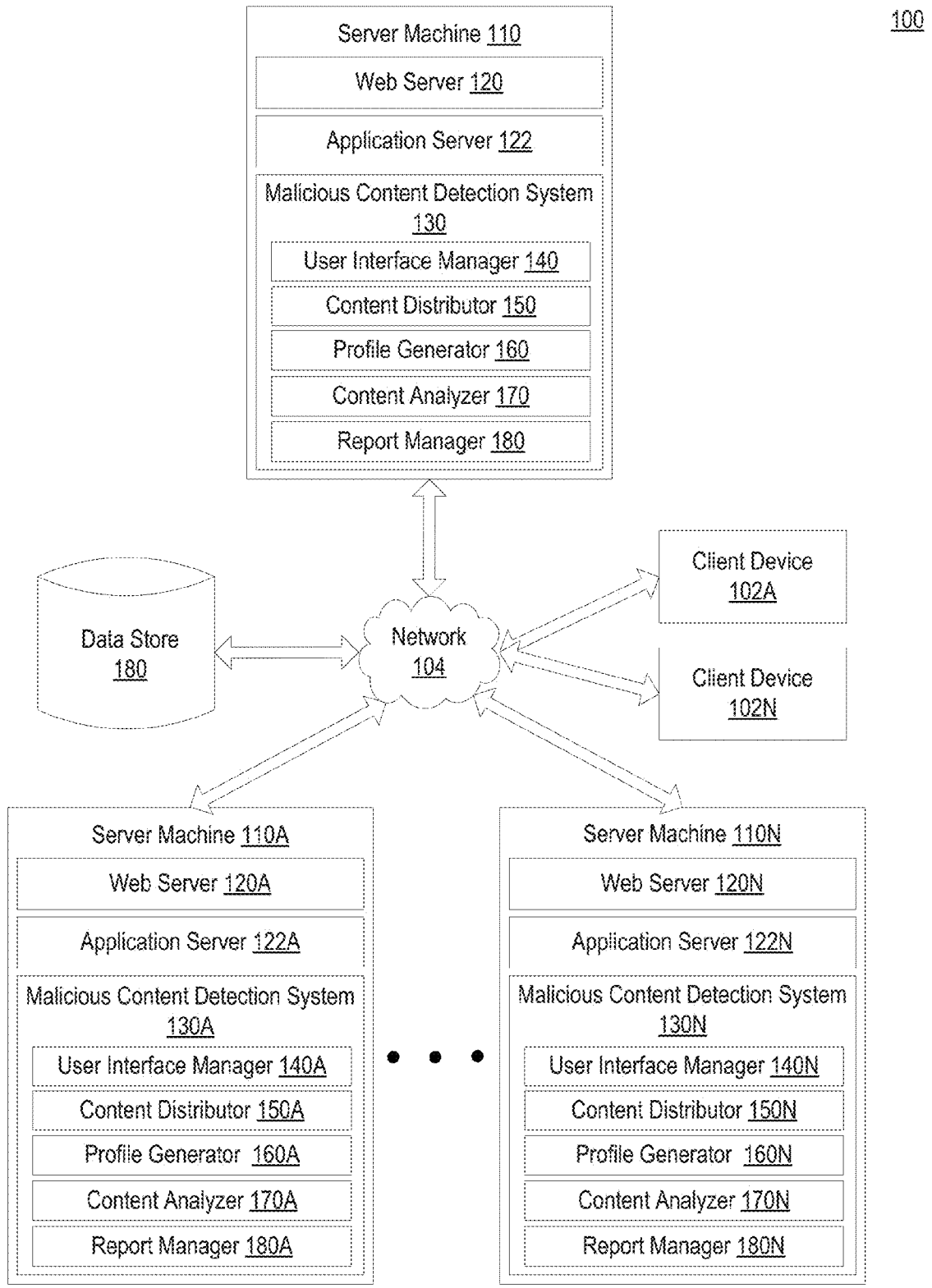
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes a plurality of server machines 110, 110A, 110N, one or more data stores 180, and one or more client devices 102A, 102N connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client devices 102A, 102N generally may be a personal computer (PC), laptop, mobile phone, tablet computer, server computer, wearable computing device, or any other type of computing device (i.e., a client machine). Client devices 102A-102N may run an operating system (OS) that manages hardware and software of the client devices 102A-102N. A browser (not shown) may run on client devices 102A-102N (e.g., on the OS of client devices 102A-102N). The browser may be a web browser that can access content and services provided by web server 120, application server 122, or a combination of web server 120 and application server 122. Other types of computer programs and computer scripts also may run on client devices 102A-102N.

Server machines 110, 110A, 110N each may include one or more web servers 120, 120A, 120N and application servers 122, 122A, 122N. Web servers 120-120N may provide text, audio, image, and video content to and from server machines 110-110N or other sources (e.g., data store 180) and client devices 102A-102N. Web servers 120-120N also may provide web-based application services, business logic, and updates to server machines 110-110N and client devices 102A-102N. Server machines 110-110N may locate, access, and consume various forms of content and services from various trusted (e.g., internal, known) web servers 120-120N and application servers 122-122N and various untrusted (e.g., external, unknown) web and application servers using applications, such as a web browser, web servers, various other types of computer applications, etc. Web servers 120-120N also may receive text, audio, video, and image content from client devices 102A-102N, which may be stored in data store 180 for preservation and/or sharing of content.

In an example, web servers 120-120N are coupled to one or more respective application servers 122-122N that provide application services, data, business logic, and/or APIs to various server machines 110-110N and client devices 102A-102N. In some examples, application servers 122-122N provide one or more such services independently, without use of web servers 120-120N.

In an example, web servers 120-120N may provide server machines 110-110N and client devices 102A-102N with access to one or more application server 122-122N services associated with malicious content detection systems 130-130N. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client devices 102A-102N may include an application associated with a service provided by one or more server machines 110-110N (e.g., malicious content detection systems 130-130N). For example, various types of computing devices (e.g., smart phones, smart televisions, tablet computers, smart wearable devices, smart home computer systems, etc.) may use specialized applications to access services provided by server machines 110-110N, to issue commands to server machines 110-110N, and/or to receive content from server machines 110-110N without visiting or using web pages.

Server machines 110-110N each include respective user interface manager 140-140N modules, content distributor 150-150N modules, profile generator 160-160N modules, content analyzer 170-170N modules, and report manager 180-180N modules. In various examples, such modules may be combined, divided, and organized in various arrangements on one or more computing devices.

In an example, functions performed by one or more of the server machines 110A-110N also may be performed by one or more other server machines 110A-110N, in whole or in part. In addition, the functionality attributed to a particular component may be performed by different or multiple components operating together. Server machines 110-110N may be accessed as a service provided by systems or devices via appropriate application programming interfaces (APIs) and data feeds, and thus are not limited to use with websites. Further, server machines 110-110N may be associated with and/or utilize one or more malicious content detection systems 130-130N.

In an example, one or more server machines 110-110N may be specialized security devices dedicated to providing malicious content detection system 130-130N services. In an example, server machines 110-110N may include one or more of a server computer, router, a switch, a firewall, a dedicated computing device, a shared computing device, a virtual machine, virtual machine guests, etc. In one example, server machines 110-110N perform activities associated with malicious content detection systems 130-130N in addition to other security activities, such as network security, application security, file security, data security, etc.

Figure 2:
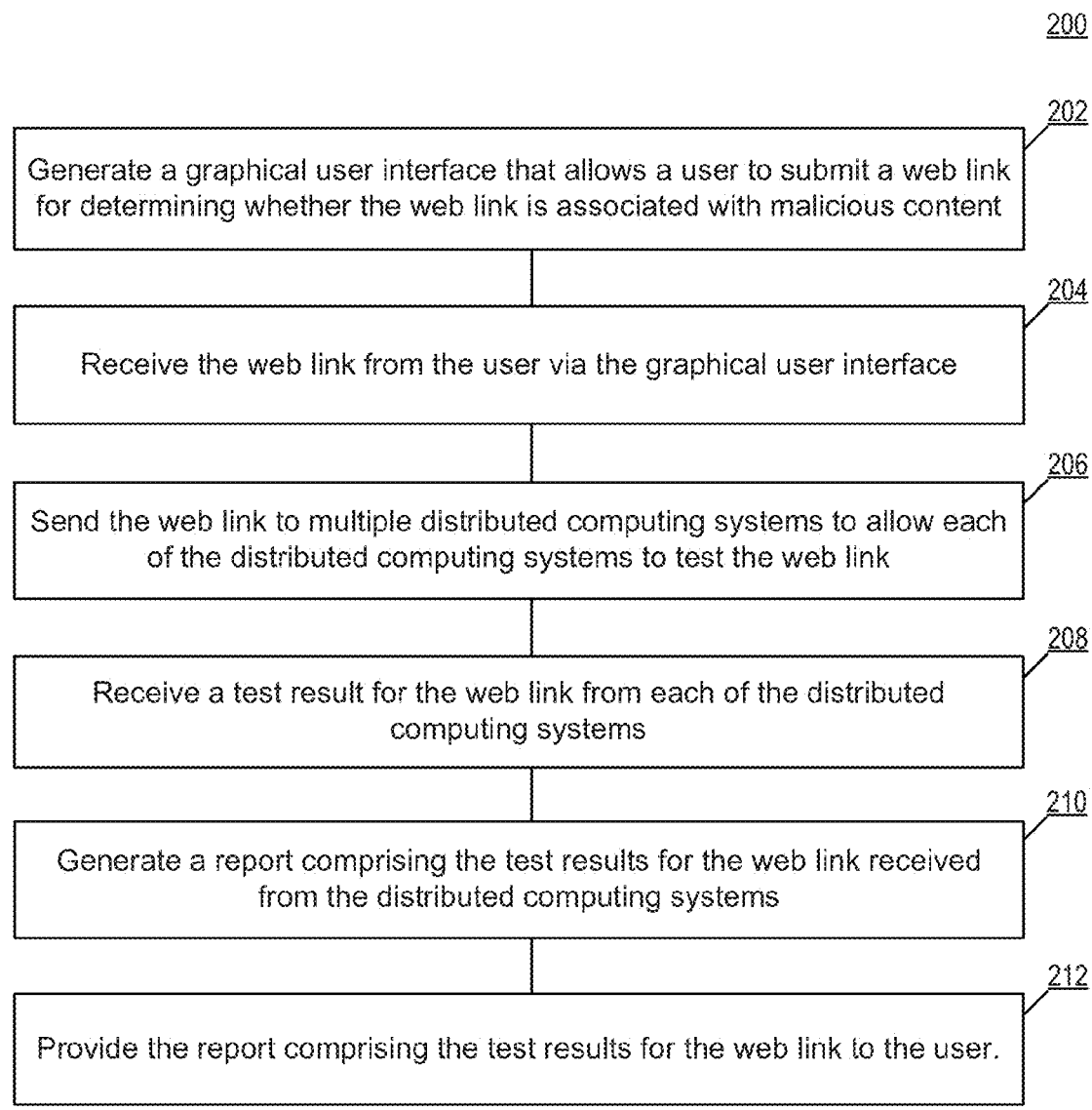
FIG. 2 is a flow diagram for providing high-yielding detection of remote abusive content, according to an example of the present disclosure.

FIG. 2 is a flow diagram for providing high-yielding detection of remote abusive content, according to an example of the present disclosure. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described with respect to malicious content detection system 130 for the sake of consistency. In addition, such examples generally apply to other malicious content detection systems 130A-130N, as described herein.

Method 200 begins at block 202 when user interface manager 140 of malicious content detection system 130 generates a graphical user interface that allows a user to submit a web link for determining whether the web link is associated with malicious content. In an example, user interface manager 140 generates a user interface allowing a user to submit one or more pieces of content for analysis to determine whether the content is associated with potential or actual malicious activity. For example, user interface manager 140 may generate and display a graphical user interface that allows the user to input or paste one or more web links (e.g., uniform resource locators, web addresses, IP addresses, or other identifiers of a location where content is located) for analysis. Web links generally may refer to a location of content that is accessible over any network 104, such as web content, hyperlinked documents, cloud storage, network storage, etc.

In an example, user interface manager 140 provides a graphical user interface that allows a user to forward or upload an e-mail or other document comprising one or more web links for analysis. For example, the graphical user interface provided by user interface manager 140 may allow users to forward one or more e-mails comprising one or more web links, forward one or more documents comprising web links via e-mail, and/or upload e-mail or other documents comprising one or more web links for analysis.

At block 204, user interface manager 140 of malicious content detection system 130 receives the web link from the user via the graphical user interface. In an example, user interface manager 140 receives one or more web links for analysis from the user via the graphical user interface. In one example, user interface manager 140 validates and formats the web links prior to analysis and testing. User interface manager 140 then provides one or more of the web links received to content distributor 150 for testing across one or more distributed server machines 110A-110N.

At block 206, content distributor 150 of malicious content detection system 130 sends the web link to multiple distributed server machines 110-110N to allow each of the distributed server machines 110-110N to test the web link. In an example, content distributor 150 determines one or more testing scenarios for testing web links provided by a user. For example, content distributor 150 may determine one or more geographic locations, one or more service providers, one or more networks, one or more network addresses (e.g., IP addresses), one or more network address ranges, one or more days, one or more times, one or more computer system versions and settings, one or more web browser versions and settings, one or more software application versions and settings, one or more installed web browsers, one or more installed applications, one or more installed character sets, one or more installed languages, one or more installed fonts, and/or one or more other user profile attributes to use for testing the web link.

In an example, content distributor 150 determines one or more of the above-noted user profile attributes to use for testing the web link based on available distributed server machines 110A-110N, configurations available for current or future use on distributed server machines 110A-110N, and one or more profile attributes available for current or future use on distributed server machines 110A-110N, etc. In some examples, content distributor 150 searches for and identifies one or more distributed server machines 110A-110N configured to test or capable of testing the web link based on one or more of the user profile attributes determined for testing the web link. In one example, one or more of web link testing scenarios, user profile attributes to use for web link testing, and distributed server machine 110A-110N configurations are determined, at least in part, based on one or more attributes or criteria provided by the user via the graphical user interface.

In an example, content distributor 150 sends a web link to multiple distributed server machines 110A-110N instructing each of the distributed server machines 110A-110N to test the web link. For example, content distributor 150 may provide a general instruction for one or more of the distributed server machines 110A-110N to test the web link. Content distributor 150 also may provide specific instructions to each of one or more of the distributed server machines 110A-110N to test the web link under one or more particular configurations or testing scenarios.

In an example, content distributor 150 sends the web link to distributed server machines 110A-110N associated with a particular organization, such as a network service provider, a computer security provider, a financial services company, or another type of organization. Content distributor 150 also may send the web link to distributed server machines 110A-110N operated by a plurality of different organizations. For example, content distributor 150 may distribute the web link to at least one distributed server machine 110A-110N in each of the plurality of different, unrelated companies participating in a community effort to identify and remove malicious content from the Internet for the benefit of users around the world. Thus, various organizations may participate collectively in providing testing and services associated with malicious content detection systems 130-130N.

At block 208, content analyzer 170 of malicious content detection system 130 receives a test result for the web link from each of the distributed server machines 110A-110N. In an example, each of a plurality of distributed server machines 110A-110N first receives the web link to test from content distributor 150. Content distributor 150 also may provide general or specific instructions for testing the web link to one or more of the distributed server machines 110A-110N either together or separate from the web link.

In an example, one or more of the distributed server machines 110A-110N adjusts or updates configuration settings to perform testing of the web link received from content distributor 150. For example, each of one or more distributed server machines 110A-110N may adjust or update various configuration settings including, but not limited to, a physical computer system configuration, a virtual computer system configuration, a web browser configuration, a software application configuration, a software installation, one or more user agent attributes, one or more user profile attributes, etc.

In an example, profile generators 160A-160N of one or more of the distributed server machines 110A-110N generate randomized or semi-randomized configuration settings and user profile attributes to use when testing the web link based on a geographic location associated with a respective distributed server machine. Such configuration settings also may be generated by and provided to respective distributed server machines 110A-110N, in whole or in part, by profile generator 160 of server machine 110. In one example, randomized configurations based on a statistical sampling of user profile attributes associated with a geographic location may be used, for example, to prevent malicious content providers and other cybercriminals from detecting, redirecting, and/or blocking testing of web links performed by distributed server machines 110A-110N.

In an example, once configured, distributed server machines 110A-110N perform one or more tests using the web link. In some examples, one or more distributed server machines 110A-110N update one or more respective configuration settings and/or user profile attributes for one or more different tests of the web link. Each distributed server machine 110A-110N then receives and records results of the web link testing. For example, each distributed server machine 110A-110N may record configuration settings and user profile attributes used to test the web link along with results of testing the web link.

In an example, web link testing results may include, but are not limited to, a resolved network address (e.g., IP address) for the web link, a subnet range for the resolved network address, a network used to perform the test, a network service provider used to perform the test, a content length value received or determined based on testing the web link, full or partial hashed or unmodified content received when testing the web link, etc. In one example, one or more distributed server machines 110A-110N capture an image or copy of content retrieved when testing the web link. The image or copy of the retrieved content then may be provided to a security authority (e.g., a blacklist operator or maintainer) that is unable to access or confirm existence of abusive content associated with the web link, thus providing the security authority with tangible evidence to justify blocking and/or taking down the content. The security authority also may perform independent testing of the web link (or a copy of the content) using one or more configurations and/or user profiles, for example, in a sandbox environment to determine behavior of the web link and associated content.

In an example, content analyzer 170 then receives and analyzes test results for the web link from each of the distributed server machines 110A-110N. In one example, content analyzer compares test results received for the web link to determine whether distributed server machines 110A-110N from a particular location and/or having certain configuration or user profile attributes are being allowed access or are being directly or indirectly (e.g., via subtle, redirection) denied access to malicious or safe content associated with a web link. For example, content analyzer 170 may analyze respective client profiles used by different distributed server machines 110A-110N to test the web link based on respective test results received from each of the distributed server machines 110A-110N. Content analyzer 170 then may determine similarities between client profiles used by the different distributed server machines 110A-110N that were allowed or denied access to one or more different forms of content associated with the web link.

Thus, content analyzer 170 may compare the respective test results received for the web link in view of the client profiles to determine one or more client profile attributes being targeted by malicious content delivered via the web link. In addition, content analyzer 170 may determine based on the test results that the web link is associated with malicious content when the web link returns different, non-similar, or unrelated content to various distributed server machines 110A-110N associated with different geographic locations, having different configuration settings, and/or having different user profile attributes.

At block 210, report manager 180 of malicious content detection system 130 generates a report comprising the test results for the web link received from the distributed server machines 110A-110N. In an example, report manager 180 generates a report comprising the test results received for the web link and analysis performed by content analyzer 170. In some examples, report manager 180 generates a web link test report based on one or more user configuration settings, query criteria, and/or reporting criteria to provide and format web link test results, web link test result analysis, and/or web link test results based on user preferences.

At block 212, report manager 180 of malicious content detection system 130 provides the report comprising the test results for the web link to the user. In an example, report manager 180 sends the test results for the web link to a user device 102A-102N for display to the user. For example, report manager 180 may display a new or updated version of a graphical user interface comprising the test results for the web link. In some examples, report manager 180 may refresh an existing graphical user interface to provide the test results. Report manager 180 also may store the results in a particular location of data store 180 (e.g., local storage, cloud storage, etc.) that is communicated to the user via an electronic message.

Figure 3:
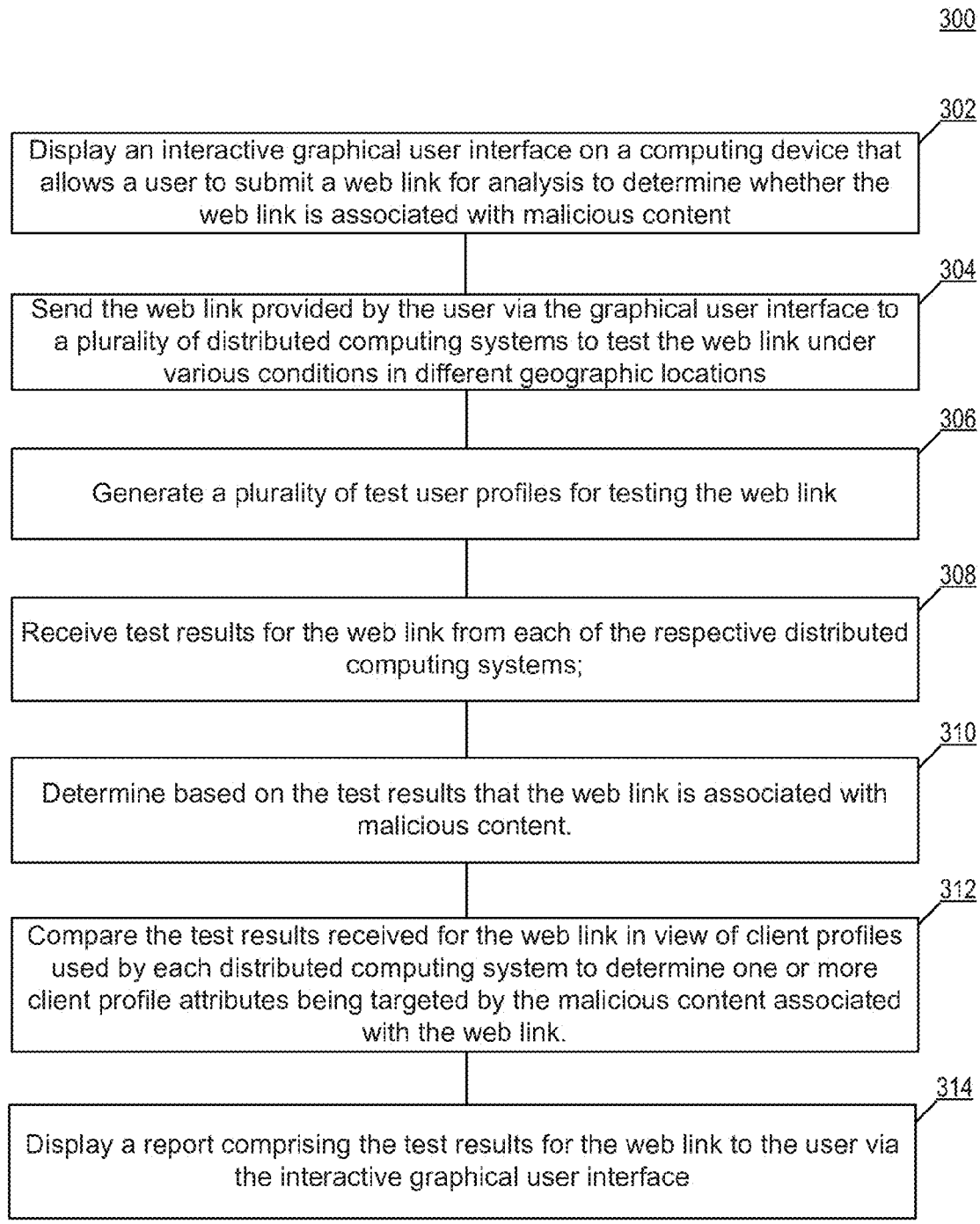
FIG. 3 is a flow diagram for identifying targeted audiences of malicious actors using high-yielding detection of remote abusive content, according to an example of the present disclosure.

FIG. 3 is a flow diagram for identifying targeted audiences of malicious actors using high-yielding detection of remote abusive content, according to an example of the present disclosure. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 are described with respect to malicious content detection system 130 for the sake of consistency. In addition, such examples generally apply to other malicious content detection systems 130A-130N, as described herein.

Method 300 begins at block 302 when user interface manager 150 of malicious content detection system 130 displays an interactive graphical user interface on a computing device that allows a user to submit a web link for analysis to determine whether the web link is associated with malicious content. In an example, user interface manager 140 generates and displays a user interface that allows a user to input one or more web links or to upload one or more web, e-mail, or other documents comprising at least one web link for analysis to determine whether the web links are associated with malicious activity, such as a phishing campaign targeting one or more user audiences.

At block 304, content distributor 150 of malicious content detection system 130 sends the web link provided by the user via the graphical user interface to a plurality of distributed server machines 110A-110N to test the web link under various conditions in different geographic locations. In an example, content distributor 150 receives one or more web links or a document comprising one or more web links submitted by the user via the graphical user interface. In some examples, user interface manager 140 validates and formats the web links prior to testing and analyzing behavior of the web links. User interface manager then may provide the web links to content distributor 150 for distributed testing using one or more distributed server machines 110A-110N situated in various geographic locations.

At block 306, profile generator 160 of malicious content detection system 130 generates a plurality of test user profiles for testing the web link. In an example, content distributor 150 determines one or more geographic locations, one or more service providers, one or more networks, one or more network addresses (e.g., IP addresses), one or more network address ranges, one or more days, one or more times, one or more computer system versions and settings, one or more web browser versions and settings, one or more software application versions and settings, one or more installed web browsers, one or more installed applications, one or more installed character sets, one or more installed languages, one or more installed fonts, and/or one or more other user profile attributes to use for testing the web link. Profile generator 160 then generates one or more test user profiles for each of a plurality of distributed server machines 110A-110N to use for testing the web link.

In an example, profile generator 160 of server machine generates a high-level test plan and general test user profiles to use for testing a web link. For example, profile generator 160 may determine that a web link is to be tested using at least ten different IP addresses in each of 100 countries to identify targets of a suspected or known phishing campaign. Respective profile generators 160A-160N of each distributed server machine 110A-110N then may generate additional test user profiles based on, and to mimic, known or expected localized computer system configurations, web browser configurations, software application configurations, software installations, user agent attributes, user profile attributes, etc. For example, one or more of the server machine 110 and distributed server machines 110A-110N may generate and use test user profile data based on a statistical sampling of user attributes corresponding to a location to test the web link. Such test user profile data may be generated randomly or semi-randomly to avoid detection of the web link testing and/or to avoid concealment of malicious content from security authorities or other non-targeted enforcement organizations by cybercriminals.

At block 308, content analyzer 170 of malicious content detection system 130 receives test results for the web link from each of the respective distributed server machines. In an example, content analyzer 170 receives at least one test result for the web link from each of a plurality of distributed server machines 110A-110N. Web link test results may comprise, for example, one or more of a resolved network address (e.g., IP address) for the web link, a subnet range for the resolved network address, a network used to perform the test, a network service provider used to perform the test, a content length value received or determined based on a test of the web link, full or partial hashed and/or unmodified web or other content received when testing the web link, etc. In addition, web link test results may comprise or be accompanied by one or more test user profiles, computer system configurations, software application configurations, user agent data, and/or other information pertaining to conditions that a respective distributed server machine 110A-110N uses to test the web link.

In an example, one or more test results for the web link may comprise or be accompanied by an image or copy of content captured by a distributed server machine 110A-110N when testing the web link. The image or copy of the content then may be provided to a security authority (e.g., blacklist maintainer, spam filter, virus protection service, etc.) that is being directly or passively blocked from accessing and proving the existence of malicious content associated with the web link. Such evidence of malicious content may be provided indirectly to give the security authority the power (e.g., authority or legal justification) to block or remove of the malicious content, even when cybercriminals have directly or passively concealed the abusive content from an authority.

In an example, content analyzer 170 analyzes test results for the web link and instructs one or more of the same or different distributed server machines 110A-110N to perform additional testing of the web link. For example, content analyzer 170 may determine based on a first round of web link testing using a few different distributed server machines 110A-110N in a plurality of countries that access to content associated with a web link is being allowed in some countries and blocked in other countries. Based on the result, content analyzer may determine that the countries where content associated with the web link is accessible are countries potentially being targeted in a phishing campaign. Content analyzer 170 then may instruct various distributed server machines 110A-110N in certain geographic locations to perform one or more rounds of additional and more focused testing of a web link to determine more specific details about one or more targeted or blocked audiences.

At block 310, content analyzer 170 of malicious content detection system 130 determines, based on the test results, that the web link is associated with malicious content. In an example, content analyzer 170 compares a full or partial amount of raw or hashed content retrieved by various distributed server machines 110A-110N that tested the web link. In one example, content analyzer 170 determines that a web link delivers similar content or the same content to a plurality of distributed server machines 110A-110N with different test user profiles and configuration settings in various geographic locations. In another example, content analyzer 170 determines that a web link delivers different, altered, or modified content to groups of one or more distributed server machines 110A-110N with different test user profiles and configuration settings in various geographic locations. In some examples, where the web link test results indicate that the web link delivers different content to different simulated audiences or actively/passively prevents certain audiences from accessing content, content analyzer 170 may determine that there is an elevated or actual risk that the web link is associated with malicious content.

In an example, content analyzer 170 compares web content or computer code gathered by respective distributed server machines 110A-110N that performed testing of a web link using different user profile attributes and configuration settings. For example, a plurality of distributed server machines 110A-110N may test a web link simultaneously, in groups, or separately during an assigned, scheduled, or unscheduled period of time.

In an example, content analyzer 170 compares web content or computer code associated with the same web link from a plurality of distributed server machines 110A-110N. Content analyzer then determines whether the web content or computer code is the same, is partially the same (or different), is substantially the same (or different), or do not have similarities. For example, the web content or computer code may be identical, associated or derivative copies (e.g., translations), partial matches (e.g., include at least some of the same content or code), unrelated, etc.

In an example, content analyzer 170 determines whether web test results are the same or different based on a threshold, for example, to account for minor variations occurring across different technology environments or periodic updates of web content. In one example, a user or an administrator specifies a threshold on a graphical user interface to indicate whether content analyzer 170 is to determine matching content based on 100% similarity, at least 90% similarity, at least 75% similarity, at least 50% similarity, or some other amount of similarity between test results received for a web link.

In an example, content analyzer 170 determines that web content or computer code returned by a web link to various distributed server machines 110A-110N is different, meaning that the web content or code is unrelated semantically (e.g., based on words, phrases, sentences, paragraphs, organization, functions, procedures, computer code variables, computer code objects, computer code structures, etc.) and/or based on subject matter. In one example, different web results based on subject matter may exist when test results from one distributed server machine 110A discuss "vacations" and test results from another distributed server machine 110N discuss "college tuition". In another example, different computer code based on subject matter may exist when test results from one distributed server machine 110A use one computer language while test results from another distributed server machine 110N (for the same web link) use a different computer language.

At block 312, content analyzer 170 of malicious content detection system 130 compares the test results received for the web link in view of client profiles used by each distributed server machine 110A-110N to determine one or more client profile attributes being targeted by the malicious content associated with the web link. In an example, content analyzer 170 determines that web link test results indicate that the web link delivers different content to different simulated audiences or conceals the content from certain audiences (e.g., as tested and as reported by a plurality of distributed server machines 110A-110N situated in different geographic locations). Content analyzer 170 then may examine user profile attributes, configuration settings and other information associated with test user profiles to determine one or more representative user audience profiles being allowed and/or denied access to content associated with a web link.

In some examples, representative audience profiles for targeted user audiences determined by content analyzer 170 are reported to a user via a graphical user interface with or independent of web link test results and analysis. In addition, representative audience profiles for users that are unable to access the content due to concealment by a cybercriminal or other party may be reported to a user via a graphical user interface along with or separate from web link test results.

At block 314, report manager 180 of malicious content detection system 130 displays a report comprising the test results for the web link to the user via the interactive graphical user interface. In an example, report manager 180 generates and displays a report comprising the test results for the web link received from the distributed server machines 110A-110N and test result analysis performed by content analyzer 170.

In an example, the report generated and displayed by report manager 180 includes a navigable two-dimensional or three-dimensional map that illustrates web link test results for each of various geographically distributed server machines 110A-110N using one or more colors and informational annotations. For example, the map may illustrate one or more servers and/or geographic locations where access to content associated with a web link was allowed, blocked, hidden, redirected, altered, etc. In addition, the report may indicate one or more distributed server machines 110A-110N or geographic locations where testing of the web link resulted in a redirection to substitute content or another website to conceal malicious content directed at particular users, user profile attributes, software configurations, computer system configurations, etc.

FIG. 4 is a diagram illustrating an example software application providing high-yielding detection of remove abusive content, in accordance with various examples of the present disclosure. Diagram 400 includes an example interactive graphical user interface associated with a malicious content detection system software application 402. Malicious content detection system software application 402 includes a content identifier control 404 with a web link for testing, a text size adjustment control 406, a configuration settings control 408, a search initiation control 410, a server machine listing 412 comprising a plurality of server machines 110-110N used to test the web link, a listing of resolved IP addresses 414 received for the web link by each of the server machines 110-110N, a listing of corresponding subnet ranges 416 determined for the web link by each of the server machines 110-110N, a listing of corresponding service providers 418 used by each of the server machines 110-110N to test the web link, a listing of content length values 420 received or determined by each of the server machines when testing the web link, a full or partial listing of hashed content 422 received by each of the server machines when testing web link, and corresponding quick indicators 424 or images describing and/or summarizing a testing result received from corresponding server machines 110-110N.

In an example, user interface manager 140 of malicious content detection system 130 displays the graphical user interface 402 for use on a client device 102A-102N of a user. The user may adjust text size using text size adjustment control 406 and configuration settings using configuration settings control 408. The user enters a web link into content identifier control 404 and selects the search initiation control 410 to submit the web link for analysis to determine whether the web link is associated with malicious content.

In an example, user interface manager 140 receives the web link submitted by the user via the graphical user interface 402. Content distributor 150 then provides the web link to a plurality of geographically distributed server machines 110A-110N to test the web link for the purposes of determining whether the web link is associated with malicious content. Content analyzers 170-170A of respective distributed server machines 110A-110N then each generate test user profiles to use for testing the web link. Content analyzers 170-170A then each test the web link, collect respective results from testing the web link, and return the respective test results to content analyzer 170 of server machine 110.

In an example, content analyzer 170 collects and analyzes the web link test results received from the distributed server machines 110A-110N. Web link test results provided by each of the distributed server machines 110A-110N may include identification and location information of a server machine, a resolved IP address received for the web link by server machine, a subnet range for the resolved IP address of the web link, a network or service provider used access the web link, a content length value received or determined when testing web link, a full or partial listing of hashed content retrieved when testing web link (e.g., where the hashing of the retrieved content was performed by a respective distributed server machine 110A-110N), etc.

In an example, report manager 180 displays the web link test results and associated analysis on the graphical user interface associated with the malicious content detection system software application 402. In diagram 400, server machine listing 412 indicates that the web link entered in content identifier control 404 was tested using a plurality of distributed server machines 110A-110N in various geographic locations. The listing of resolved IP addresses 414 and the listing of corresponding subnet ranges 416 indicate that most of the distributed server machines 110A-110N were directed to the same location by the web link. However, a server machine in Turkey was directed to a different location by the web link, and server machines in China and Malaysia were not used in testing the web link.

Continuing with the example in diagram 400, the listing of content length values 420 received or determined by each of the server machines 110A-110N and the listing of hashed content 422 received by each of the server machines when testing web link indicates that servers in the United States, Canada, Germany, Pakistan, and Australia were forbidden from accessing content associated with the web link. In addition, server machines in Brazil, the United Kingdom, France, Italy, Russia, India, and Thailand received matching content when testing the web link. However, a server machine in Turkey received different content compared to the other server machines 110A-110N that received content when testing the web link (e.g., possibly because a phishing scheme is being targeted at users located in Turkey). Further, the listing of quick indicators 424 indicate server machines 110A-110N that were unable to access or were denied access to content associated with the web link (e.g., "–"), that accessed content associated with the web link and received a result matching a majority of other server machines 110A-110N (e.g., "+"), that accessed content associated with the web link and received a result that does not match a majority of other server machines 110A-110N (e.g., "~"), and that were not used to test the web link or had other issues in testing the web link (e.g., "×").

Figure 5:
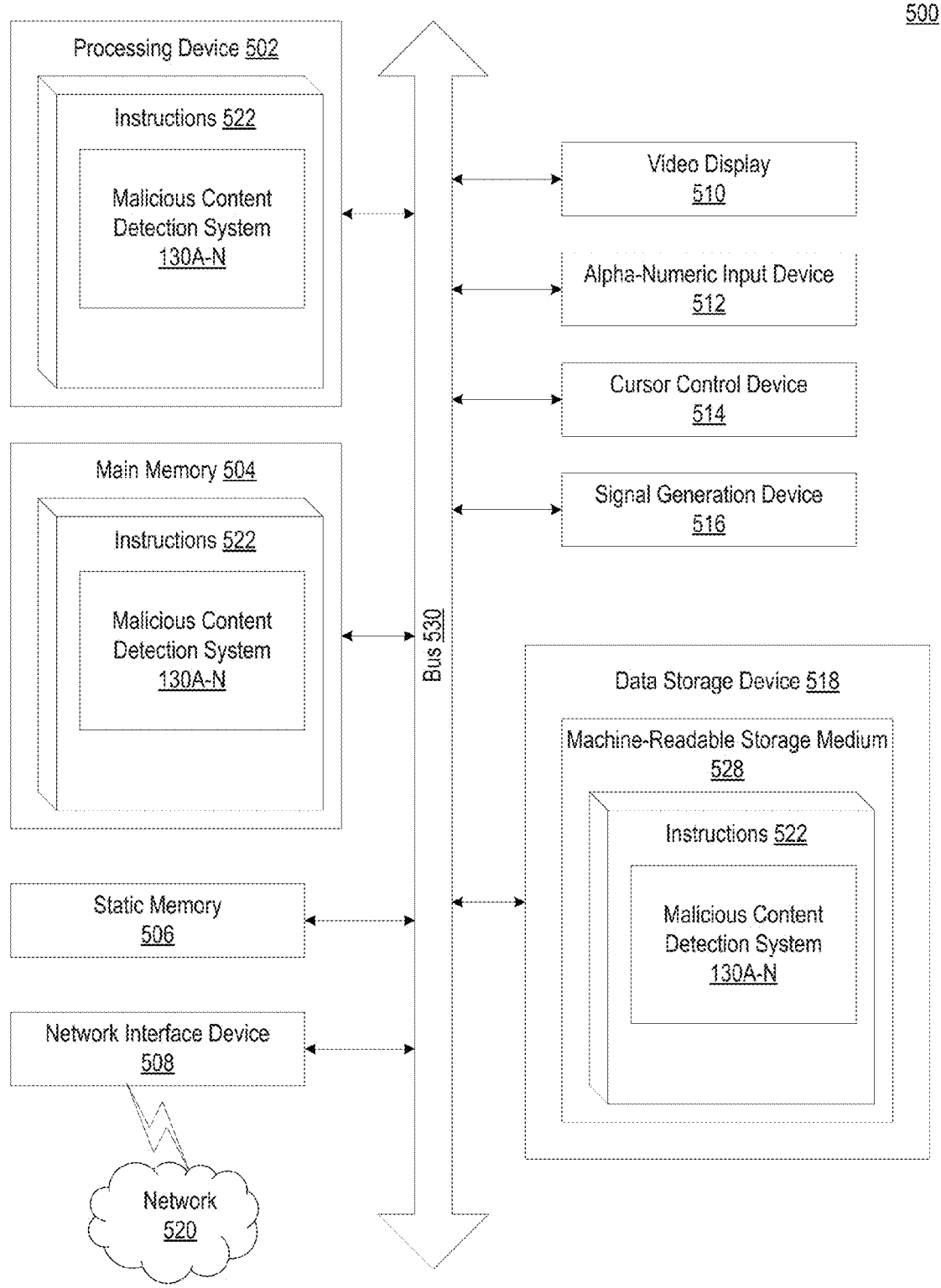
FIG. 5 is a block diagram of an exemplary computer system that may perform one or more of the operations described herein.

FIG. 5 illustrates a diagram of a machine in the exemplary form of a computer system 500, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 also may be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 also may include a network interface device 508. The computer system 500 may further include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software computer instructions) embodying any one or more of the methodologies or functions described herein. The instructions 522 also may reside, completely or at least partially, within the main memory 504 and/or within the processor 502 during execution thereof by the computer system 500, the main memory 504 and the processor 502 also constituting computer-readable storage media. The instructions 522 may be transmitted or received over a network 520 via the network interface device 508.

In one example, the instructions 522 include instructions for one or more modules of an malicious content detection system (e.g., malicious content detection system 130, 130A, 130N of FIG. 1) and/or a software library containing methods that call a malicious content detection system 130, 130A, 130N. While the computer-readable storage medium 528 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system for providing anonymous inter-organizational data security, comprising:
   a connection to a computer network;
   a non-transitory memory comprising instructions; and
   a processing device coupled to the non-transitory memory and configured to execute the instructions to cause the computer system to:
      generate a graphical user interface that allows a user to submit a web link for analysis to determine whether the web link is associated with malicious content;
      receive the web link provided by the user for analysis via the graphical user interface;
      send, via the computer network, the web link provided by the user to a plurality of distributed server machines to allow each of the distributed server machines to test the web link;
      receive, via the computer network, a test result for the web link from each of the distributed server machines;
      compare the respective test results received for the web link in view of client profiles used by each distributed server machine to test the web link to determine one or more client profile attributes being targeted by malicious content associated with the web link;
      generate a report comprising the test results for the web link received from the distributed server machines, the test results comprising an indication of profile attributes that cause the malicious content to be concealed; and
      provide the report comprising the test results for the web link to the user.

2. The computer system of claim 1, wherein the processing device further is to:
   compare the respective test results received for the web link to determine whether content associated with the web link is accessible from each of the distributed server machines.

3. The computer system of claim 1, wherein the processing device further is to:
   determine differences in respective client profiles used by different ones of the distributed server machines for causes of different respective test results received from each of the distributed server machines.

4. The computer system of claim 1, wherein the processing device further is to: determine similarities between respective client profiles used by different ones of the distributed server machines that were denied access to content associated with the web link.

5. The computer system of claim 1, wherein the processing device further is to: determine, based on the test results for the web link, that the web link is associated with the malicious content.

6. The computer system of claim 1, wherein the report includes the one or more client profile attributes determined as being targeted by malicious content associated with the web link.

7. The computer system of claim 1, wherein respective test results received from each of the distributed server machines each comprise a hash of a response received from testing the web link.

8. The computer system of claim 1, wherein the processing device further is to: provide a list of one or more common client profile attributes from respective distributed server machines that were allowed access to content associated with the web link.

9. The computer system of claim 1, wherein the test result received from a respective distributed server machine used to test the web link comprises an image of malicious content retrieved when testing the web link.

10. The computer system of claim 1, wherein the processing device further is to:
    provide proof of the malicious content to a security authority, wherein the proof is from one or more of the distributed server machines that retrieved the malicious content when testing the web link, and wherein the malicious content is being hidden from the security authority through denial of access.

11. The computer system of claim 10, wherein the proof of the malicious content is provided to the security authority to allow the security authority to blacklist the web link in response to the security authority being denied access to the malicious content.

12. The computer system of claim 1, wherein the processing device further is to: generate a plurality of test user profiles for testing the web link.

13. The computer system of claim 12, wherein the test user profiles are generated randomly based on a statistical sampling of user attributes for a location associated with one of the distributed server machines.

14. The computer system of claim 1, wherein the processing device further is to:
    provide one or more test user profiles to each of the distributed server machines for use in testing the web link.

15. The computer system of claim 14, wherein the one or more test user profiles are generated based on a statistical sampling of user attributes corresponding to respective locations of distributed server machines.

16. The computer system of claim 1, wherein the each of the distributed server machines generate one or more test user profiles to use when testing the web link.

17. The computer system of claim 1, wherein the report further comprises a map illustrating one or more locations where access to the web link is available and one or more other locations where access to the web link is blocked.

18. The computer system of claim 1, wherein the report indicates that at least one of the distributed server machines was able to access the malicious content associated with the web link while one or more other distributed server machines were redirected to another site to conceal the malicious content.

19. A non-transitory computer-readable medium comprising computer-readable instructions that, when executed by one or more processors of a computer system, cause the one or more processors to perform operations comprising:
    displaying a graphical user interface that allows a user to submit a web link for analysis to determine whether the web link is associated with malicious content;
    sending, via a computer network, the web link provided by the user via the graphical user interface to a plurality of distributed server machines in different countries to test the web link in various geographic locations;
    receiving, via the computer network, a test result for the web link from each of the distributed server machines;
    comparing the respective test results received for the web link in view of client profiles used by each distributed server machine to test the web link to determine one or more client profile attributes being targeted by malicious content associated with the web link;

generating a report comprising the test results for the web link received from the distributed server machines in the different countries, the test results comprising an indication of profile attributes that cause the malicious content to be concealed; and displaying the report comprising the test results for the web link to the user via the graphical user interface.

20. A computer-implemented method, comprising:

displaying, by one or more processors, an interactive graphical user interface that allows a user to submit a web link for analysis to determine whether the web link is associated with malicious content;

sending, via a computer network by the one or more processors, the web link provided by the user via the interactive graphical user interface to a plurality of distributed server machines in different locations to test the web link using various user profile attributes;

receiving, via the computer network by the one or more processors, one or more test results for the web link from each of the distributed server machines;

comparing the respective test results received for the web link in view of client profiles used by each distributed server machine to test the web link to determine one or more client profile attributes being targeted by malicious content associated with the web link;

generating, by one or more processors, a report comprising the test results from the distributed server machines, the test results comprising an indication of profile attributes that cause the malicious content to be concealed; and displaying, by one or more processors, the generated report comprising the test results for the web link via the interactive graphical user interface.

* * * * *